US 8,095,265 B2
Jan. 10, 2012

(12) United States Patent
Boss et al.

(10) Patent No.: US 8,095,265 B2
(45) Date of Patent: Jan. 10, 2012

(54) RECORDING, STORING, AND RETRIEVING VEHICLE MAINTENANCE RECORDS

(75) Inventors: Gregory J. Boss, American Fork, UT (US); Peter G. Finn, Brampton (CA); Rick A. Hamilton, II, Charlottesville, VA (US); Brian M. O'Connell, Cary, NC (US); James W. Seaman, Falls Church, VA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 12/245,845

(22) Filed: Oct. 6, 2008

(65) Prior Publication Data

US 2010/0085193 A1  Apr. 8, 2010

(51) Int. Cl.
*G01M 17/00* (2006.01)
*G06F 19/00* (2006.01)
*G06F 7/00* (2006.01)

(52) U.S. Cl. ....... 701/35; 340/541; 340/568.1; 340/571; 340/545.2; 340/937; 701/29; 701/30

(58) Field of Classification Search ............... 340/573.1, 340/425.5–430; 701/29, 30, 35, 73; 73/117.2, 73/117.3
See application file for complete search history.

(56) References Cited

U.S. PATENT DOCUMENTS

| | | | | |
|---|---|---|---|---|
| 4,064,501 A * | 12/1977 | Yost et al. | ................. | 340/286.06 |
| 4,420,238 A * | 12/1983 | Felix | ................. | 396/427 |
| 5,027,104 A * | 6/1991 | Reid | ................. | 340/541 |
| 5,065,321 A * | 11/1991 | Bezos et al. | ................. | 455/456.1 |
| 5,218,543 A * | 6/1993 | Komatsu | ................. | 701/35 |
| 5,793,420 A | 8/1998 | Schmidt | | |
| 5,815,093 A * | 9/1998 | Kikinis | ................. | 340/937 |
| 5,995,898 A | 11/1999 | Tuttle | | |
| 6,002,326 A * | 12/1999 | Turner | ................. | 340/426.1 |
| 6,003,808 A * | 12/1999 | Nguyen et al. | ................. | 244/1 R |
| 6,151,065 A * | 11/2000 | Steed et al. | ................. | 348/148 |
| 6,262,764 B1 | 7/2001 | Perterson | | |
| 6,297,734 B1 * | 10/2001 | Richardson et al. | ..... | 340/539.26 |
| 6,487,479 B1 * | 11/2002 | Nelson | ................. | 701/29 |
| 6,529,620 B2 * | 3/2003 | Thompson | ................. | 382/141 |
| 6,583,730 B2 | 6/2003 | Lang et al. | | |
| 6,587,768 B2 * | 7/2003 | Chene et al. | ................. | 701/33 |
| 6,732,028 B2 * | 5/2004 | Vanstory et al. | ................. | 701/33 |
| 6,744,367 B1 * | 6/2004 | Forster | ................. | 340/572.7 |
| 6,803,854 B1 * | 10/2004 | Adams et al. | ................. | 340/531 |
| 6,822,582 B2 * | 11/2004 | Voeller et al. | ................. | 340/933 |
| 6,869,821 B2 * | 3/2005 | Knipp et al. | ................. | 438/99 |
| 6,898,489 B1 * | 5/2005 | Hayes, Sr. | ................. | 701/1 |
| 6,950,013 B2 * | 9/2005 | Scaman et al. | ................. | 340/436 |
| 6,956,467 B1 * | 10/2005 | Mercado, Jr. | ................. | 340/426.2 |

(Continued)

*Primary Examiner* — Daniel Wu
*Assistant Examiner* — Son M Tang
(74) *Attorney, Agent, or Firm* — Patrick J. Daugherty; Driggs, Hogg, Daugherty & Del Zoppo Co., LPA

(57) ABSTRACT

A variety of sensors, such as mechanical triggers, light sensors and motion sensors, magnetic sensors, and radio frequency identification tags, are strategically placed throughout a motor vehicle to detect service and maintenance activities relating to the vehicle during the lifetime of the vehicle. A sensed activity then activates a suitable recording device, such as a video recorder, to record the activity. The completion of the activity likewise is sensed and causes deactivation of the recording device. The recorded activity is typically retained in a non-erasable, indexed storage device from which it can be easily retrieved. The sensors may also be used for tamper detection and vehicle motion detection.

20 Claims, 3 Drawing Sheets

U.S. PATENT DOCUMENTS

| | | | |
|---|---|---|---|
| 7,023,333 B2 | 4/2006 | Blanco et al. | |
| 7,068,301 B2 * | 6/2006 | Thompson | 348/141 |
| 7,123,907 B2 * | 10/2006 | Sumcad et al. | 455/423 |
| 7,183,945 B2 | 2/2007 | DiDomenico et al. | |
| 7,184,866 B2 * | 2/2007 | Squires et al. | 701/33 |
| 7,315,248 B2 * | 1/2008 | Egbert | 340/572.7 |
| 7,319,378 B1 * | 1/2008 | Thompson et al. | 340/426.1 |
| 7,383,318 B2 * | 6/2008 | Craik | 709/217 |
| 7,388,489 B2 * | 6/2008 | Sagawa | 340/572.1 |
| 7,420,467 B2 * | 9/2008 | Patenaude et al. | 340/572.1 |
| 7,516,001 B2 * | 4/2009 | Harumoto et al. | 701/36 |
| 7,535,352 B2 * | 5/2009 | Sobol | 340/541 |
| 7,778,751 B2 * | 8/2010 | Murphy et al. | 701/33 |
| 7,782,178 B2 * | 8/2010 | Chen et al. | 340/426.1 |
| 7,804,426 B2 * | 9/2010 | Etcheson | 340/937 |
| 2004/0039577 A1 * | 2/2004 | Roan et al. | 705/1 |
| 2004/0138898 A1 * | 7/2004 | Elbrader | 705/1 |
| 2005/0119009 A1 | 6/2005 | Bauchot et al. | |
| 2005/0143883 A1 * | 6/2005 | Yamagiwa | 701/32 |
| 2005/0251344 A1 * | 11/2005 | Appel et al. | 702/19 |
| 2006/0098094 A1 | 5/2006 | Lott | |
| 2006/0229928 A1 * | 10/2006 | Nix, Jr. | 705/9 |
| 2006/0255945 A1 * | 11/2006 | Egbert | 340/572.7 |
| 2007/0018830 A1 * | 1/2007 | Inoue et al. | 340/572.4 |
| 2007/0135980 A1 * | 6/2007 | Plante | 701/35 |
| 2008/0100705 A1 * | 5/2008 | Kister et al. | 348/143 |
| 2008/0183722 A1 * | 7/2008 | Lane et al. | 707/100 |
| 2009/0303326 A1 * | 12/2009 | DeCosmo | 348/148 |
| 2010/0217457 A1 * | 8/2010 | Georgi et al. | 701/2 |

* cited by examiner

RECORDING, STORING, AND RETRIEVING VEHICLE MAINTENANCE RECORDS

FIELD OF THE INVENTION

This invention relates to the use of sensors in cooperation with the computer system associated with a vehicle to track and visually record service and maintenance activities relating to the vehicle during a given time span or during the life cycle of the vehicle.

BACKGROUND OF THE INVENTION

It is common knowledge that a properly maintained motor vehicle is more dependable, safer, lasts longer, and increases the satisfaction of its owner as compared to a vehicle that is poorly maintained. Furthermore, following a good maintenance schedule helps to preserve the integrity of any warranty that the owner might have on the vehicle. In addition, the residual value of the vehicle is higher at the time of sale or trade-in. Accordingly, systems for implementing and improving the quality of maintenance and repair of vehicles can be extremely beneficial to the owner, family members and others.

The only current method to ensure that proper maintenance procedures were performed on a vehicle would be to have a neutral and technically trained third party actually observe every service action. This, of course, is not practical.

The purchase of a used motor vehicle is an inherently risky transaction. The buyer suffers from what economists term "an imbalance of information", wherein the seller, or previous sellers, usually know considerably more about the vehicle being exchanged than the potential buyer.

SUMMARY OF THE INVENTION

The present invention relates to a system and method for detecting and recording vehicle maintenance activity by capturing, indexing, and storing the activity during vehicle servicing. Logic is employed to activate the recording device when such an activity is commenced and to stop recording upon sensing that the activity has been completed.

The invention also relates to a method and a system for detecting and recording maintenance activity that is performed on a motor vehicle. A sensor means located on the vehicle detects the onset of a maintenance or repair activity on a component of the vehicle. In response, a sensory recording device, such as a video recorder, is located on the vehicle in proximity to the maintenance and is positioned to record the activity.

The sensor means is selected from the group consisting of mechanical triggers, motion detectors, light detectors, infrared detectors, magnetic detectors, and RFID tags. It is located on the vehicle in proximity to the component to be repaired or maintained, and provides the logic to activate the video recording device when the activity is commenced. The video recorder includes at least one of the following features: the ability to produce a high quality video over a wide spectrum of light conditions; a digital streaming output; encoding in a low-loss format; motion activatable; low power consumption; and a time stamped output.

The invention further comprises a method utilizing the steps of producing computer executable program code; storing the code on a computer readable medium; and providing the program code to be deployed and executed on an on-board computer system associated with a motor vehicle. The program code comprises instructions which, when executed on the computer system, cause the computer system to read data obtained from a sensor associated with the motor vehicle relative to the onset of a given activity. The data obtained from the sensor is used to activate at least one recording device, such as a video camera, in the vicinity of said activity. Additional data is used to stop the recording at the end of the activity. The recording is further processed for storage, editing, updating or viewing generally, program code activates one or more video cameras to record the performance of maintenance or repair on the vehicle.

The invention further comprises a method for deploying an application for visually detecting an activity in connection with a motor vehicle. The method comprises providing a computer system that is operable to receive information indicative of a predetermined activity on said vehicle; to generate a signal to activate visual means to record the predetermined activity; and to store indicia indicative of the visual means upon completion of the activity. The computer system produces computer executable program code which is stored in a computer readable medium installed on a motor vehicle. The program code is deployed and executed on a computer system. The code comprises instructions which, when executed on the computer system, causes the computer system to read data obtained from a sensor associated with the motor vehicle relative to the onset of said predetermined activity. The data obtained from the sensor is used to activate at least one video recording device in the vicinity of said activity. Additional data is employed to stop the video recording at the end of the activity and to further process the video recording for storage, editing, updating or viewing.

BRIEF DESCRIPTION OF THE DRAWINGS

These and other features of this invention will be more readily understood from the following detailed description of the various aspects of the invention taken in conjunction with the accompanying drawings in which.

Figure 1:
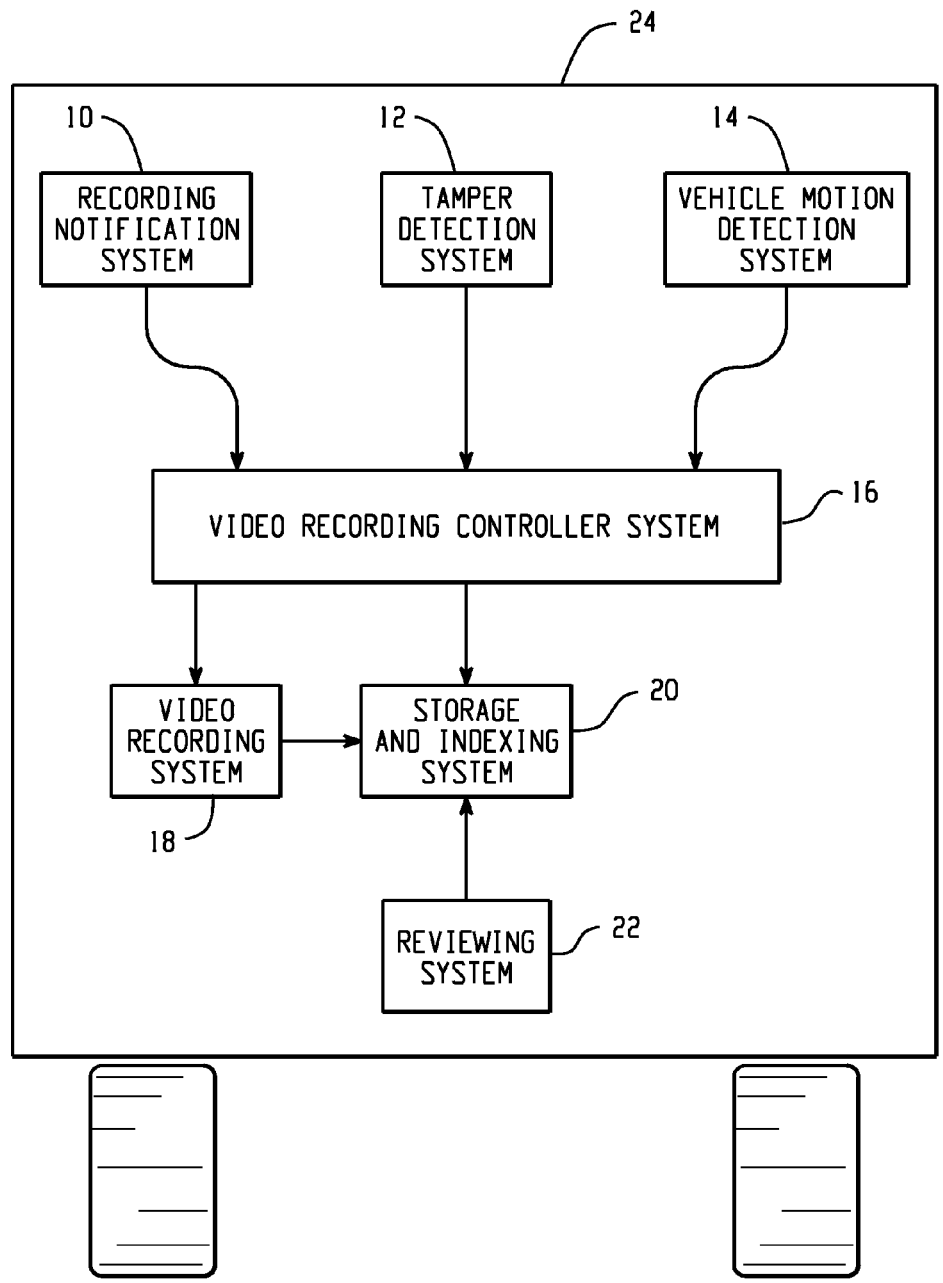
FIG. 1 is a block diagram of a recording detection system of the present invention.

The drawings are not necessarily to scale. They are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In more detail, the present invention relates to a method to record, store, index, and review vehicle maintenance using one or more recorders such as video cameras, a storage system, and a multitude of sensors. Each camera is used to record a video of maintenance activities performed on a portion of the vehicle within range of the camera. The video recordings from each camera are retained in a storage system that preferably is tamper proof. Sensors are used to determine when to record service events, and to detect tampering, as well as detect when a maintenance task has been completed.

The present invention provides an incentive for a service technician to correctly perform work on a vehicle, thus protecting the consumer from fraud or negligence. Inversely, this invention also protects the service technician or a warranty company from liability due to a person performing an improper maintenance activity that possibly voids the warranty. If the vehicle is being resold, the potential buyer may want to review some of the recordings to inspect and verify the quality of service performed on the vehicle.

The present invention includes the following components and systems:

1. Recording Notification System
2. Vehicle Recording Controller System
3. Visual Recording System
4. Storage System
5. Indexing System
6. Reviewing System
7. Tamper Detection System
8. Vehicle Motion Detection System Turning now to the drawings, FIG. 1 is block diagram showing a recording notification system 10 that serves to monitor sensor data. This system 10, typically mounted within a motor vehicle 24, is alerted when one or more sensors, such as the tamper detection system 12 and the vehicle motion detection system 14, are activated. The recording notification system 10 then alerts the video recording controller system 16 which in turn activates the video recording system 18. This recording system controls one or more video cameras that are positioned within range of the activity that was detected by the sensor(s). At the end of the alert, the captured video is transferred to a data storing and indexing system 20. The stored and indexed data can then be accessed in the reviewing system 22, such as a simple computer monitor.

The recording notification system 10 is comprised of mechanical triggers and other sensors including but not limited to light sensors, motion sensors, RFID, magnetic sensors and infrared path sensors. The light, motion, and magnetic sensors all are well known devices, and are available commercially from numerous sources. Radio-frequency identification (RFID) is an identification method that relies on storing and remotely retrieving data using devices called RFID tags or transponders. An RFID tag is an object that can be attached to or incorporated into a vehicle component for the purpose of identification using radio waves. All RFID tags contain at least two parts. One is an integrated circuit for storing and processing information, modulating and demodulating a radio frequency (RF) signal and perhaps other specialized functions. The second part is an antenna for transmitting and receiving the signal. The RFID tag can be read from a distance of several meters, and does not necessarily need to be in the line of sight of the reader. A receiver, such as a radio frequency reader, is used to capture a signal from said tag. It employs circuitry to transmit the captured signal to a remote location, such as the on-board computer module.

The RFID tag could take on many forms. The RFID tag can be a passive tag, an active tag, or a semi-passive tag. With a passive tag, the reader(s) emits an electromagnetic field that induces an electrical current in an antenna of the tag. The electrical current provides power for the tag, for example, for powering an integrated circuit in the tag, which invokes the tag to emit or transmit the information stored in the tag (e.g., in Electrically Erasable Programmable Read-Only Memory, or EEPROM, etc.) via the antenna.

With an active tag, the RFID tag includes an internal power source, such as a battery, a solar cell, etc., that powers the integrated circuit, which broadcasts the certification information for reception by an authorized reader tuned to a broadcast frequency. Alternatively or additionally, the RFID tag may be powered from the battery of the vehicle. The RFID tag may also be semi-passive in that an internal battery or the vehicle's battery may provide power to activate the tag, but the field provided by the reader invokes the broadcast of the certification information.

It should be understood that the invention is not limited solely to the use of RFID tags as sensors. Other similar devices, such as RuBee* long wavelength tags, VLIS visible light identification tags and Memory Spot tags (developed by Hewlett-Packard, Inc.) can likewise be utilized as sensors in the practice of this invention. *registered trademark of Visible Assets, Inc.

The present invention contemplates that multiple sensors would be used in concert to prevent false positives. When one or more sensors is activated, the recording notification system monitoring the sensor data informs the video recording controller system 16 that such sensors have been activated. Sensors are placed in positions where, if activated, would indicate that a camera in the vicinity should record the environment. Sensors preferably are installed in positions and locations that are physically difficult to access and, as such, difficult to tamper with. Some example locations for sensors include: A trigger switch within the vehicle's hood latch to detect when the hood is raised, a close proximity RFID reader at the front of the vehicle below the hood so that when the RFID tagged hood is raised, the tag is no longer in the range of the receiver, or is at a distance beyond a preset threshold from the receiver using known RFID distance detection methods. This latter method detects the speed of response from the tag to the receiver, recognizing that the further away, the longer the response time. Other methods, such as triangulation, may be used where multiple readers are utilized.

Video Recording Controller System

The video recording controller system contains the methods and logic to accept signals from subsystems, process them, and send action commands to other subsystems. Additionally, this system interacts with a vehicle service tracking system to record the type of maintenance performed.

Figure 2:
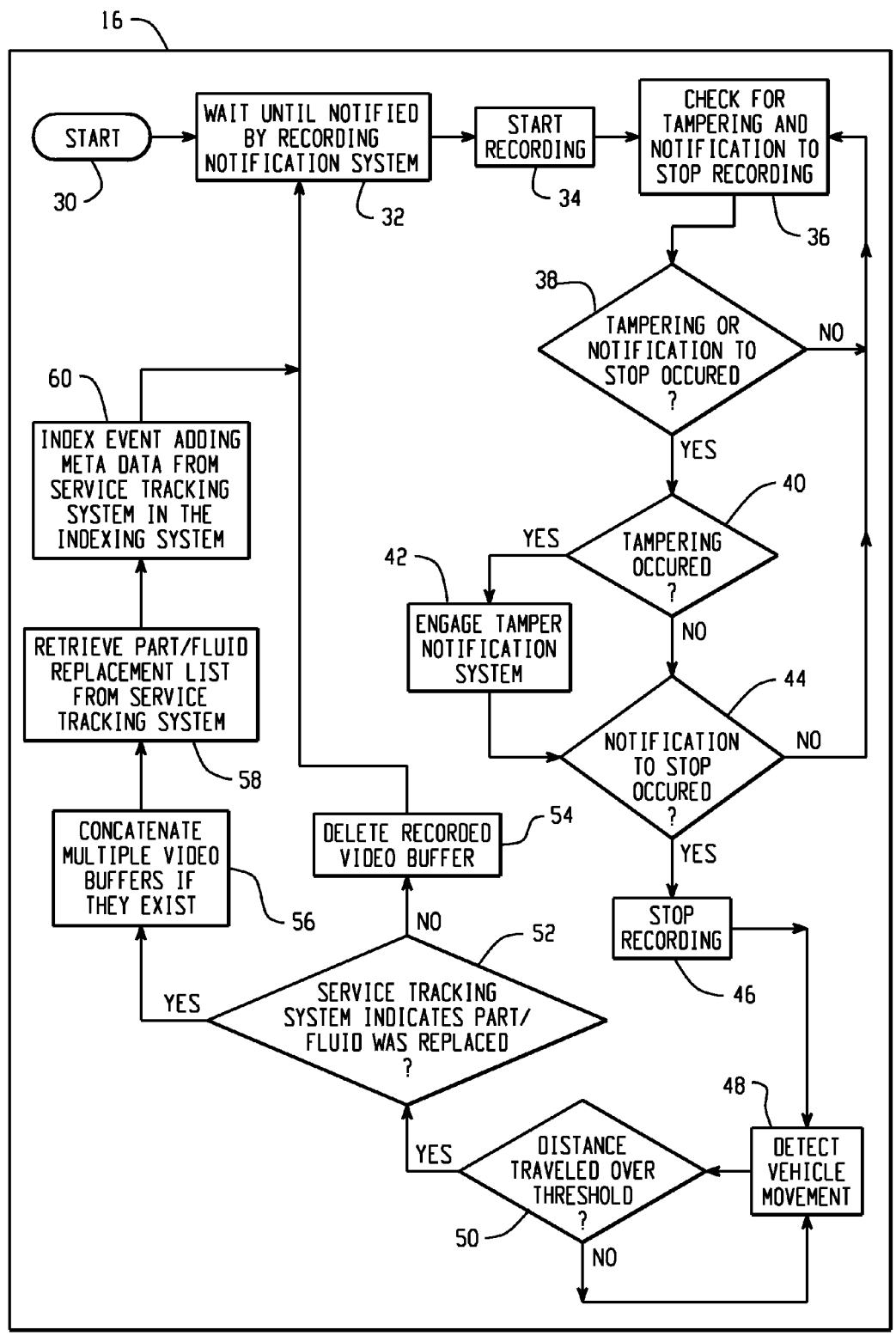
FIG. 2 illustrates a typical flow logic of the invention.

FIG. 2 shows the logical flow for the video recording controller system 16 of the present invention. From the start 30, the system waits at 32 until notified by the recording notification system (shown in FIG. 1) that a maintenance or repair event has commenced and that one or more sensors has been activated to indicate that a video camera or multiple cameras should start recording. Once the controller system has received that notification, it starts the recording process at 34 by engaging the visual recording system in the appropriate area as indicated by the recording notification system. The visual recording system captures images at a predetermined frame rate from one or more cameras and stores them in a buffer on the storage system (shown in FIG. 1).

At this point, the system loops around looking either for notification to stop recording or visual recording of evidence of tampering at 36. If tampering is not detected at 38, the visual recording continues. If tampering is detected at 40, the system engages the tamper notification system 42. Notification to stop recording 44 comes from the recording notification system. If a notification to stop has not occurred, then the recording continues. On the other hand, if notification to stop does occur, the video recording is stopped. Generally, this occurs if the condition that initially caused recording to start no longer exists. For example, if a hood latch triggers causes the recording to start and the hood latch trigger now indicates the hood is closed, that would trigger an event to stop recording. For another example, if no motion is detected after a preset threshold time span, e.g. a hood is left open during a lunch or coffee break, and then recording can be paused and then resumed when motion is again detected. Once notification to stop recording occurs at 46, the system then engages the vehicle motion detecting system 48 to measure and detect vehicle movement. If the vehicle has moved, its movement is compared at 50 to a predetermined distance threshold. If the movement does not meet the threshold, then movement detection continues in a loop until it has met or exceeded the threshold. This ensures that the service event is over and the vehicle is not being moved in normal servicing operations.

Once the distance threshold is met, the service tracking system is queried at 52 to see if parts or fluid were replaced. If the answer to the query is negative, all video buffers recorded since the initial recording notification are deleted at 54. This prevents storing non-part and non-fluid replacement events, such as inspecting battery terminals, checking fluids, etc. If the query is answered 'yes', all video buffers since the initial recording are concatenated or joined together at 56 to create one seamless video buffer. The part/fluid replacement list is then retrieved from the service tracking system at 58 and the indexing system 60 is utilized to associate the metadata of part replacement, time periods, and other accumulated information to the video footage. This update is then concatenated with the output from the buffer delete 54 and the updated data stream then forms the basis for subsequent activation by any of the sensors within the vehicle.

Visual Recording System

The visual recording apparatus is comprised of one or more cameras in positions where an active recording notification sensor would indicate that vehicle maintenance potentially is going to be performed in a location of the vehicle in which the visual recording system can capture. Multiple cameras may be tripped by a single sensor or a set of sensors. The cameras typically are positioned to cover multiple angles of the maintenance area. Some example locations where visual recording systems can be placed include underneath the hood of the car, in the front of the engine compartment facing the rear of the vehicle, from the side or the rear or beneath the frame of the vehicle.

Differing embodiments may choose from different types of cameras, but all would have the following features:

Ability to produce high quality video in a wide spectrum of light conditions;

Digital streaming output, encoding in a low-loss format;

Low power consumption;

Motion activation capable; and

Produce time-stamped output

Storage and Indexing System

Video is stored on an indexable rapid access medium. Examples of such mediums are hard disk drives and nonvolatile memory. A medium that stores the data without requirements for continual power availability, such as a hard disk drive, is preferred over other systems that cannot retain data after prolonged power outages. The storage system must be capable of storing a large amount of data with a low probability of data loss. Additionally, the storage system must be capable of storing or buffering and retrieving data at a rate equal to or greater than the incoming video data rate. Additionally, the storage system preferably is installed in a tamper-proof or tamper-evident container.

The storage system has the further capability to save and erase buffers, and to concatenate multiple buffers.

The indexing system is an implementation of a persistent data store, that may or may not utilize the same underlying physical storage medium of the storage system. The indexing system allows the storage of metadata associated with each video segment. The metadata may vary by implementation, but all embodiments would store the following metadata:

Date and time

Parts replaced or service performed

Location of video footage on the physical medium

Other metadata that may be available may include dealer or mechanic location name and address, service technician name and registration number or other identifier, price paid for the parts replaced or service performed, etc.

Reviewing System

The present invention contemplates that several methods to review the video footage are feasible. Vehicles equipped with video screens can display the recordings on the video screens. Other vehicles can allow a user to connect to the reviewing system with a computer over a wired or wireless network to access the video. Additionally, a proprietary interface can be created to allow a user to view video footage. Preferably, the user interface would allow the user to navigate through the recorded footage indexed by date, maintenance task, or other metadata.

Periodically the recorded data can be externalized to a WORM (write-once-read-many) device such as a DVD. This DVD could then be used to view service records. This serves to reduce the storage space needed in-vehicle and would allow for the external compilation of a vehicle's complete service history. If recorded in an industry standard format, no special interface would be required to view such data. If a proprietary format is used, an associated software program may be required to view the data. In such an embodiment, the in-vehicle recorded data can be deleted once it has been externalized and verified. Another feature may be that the in-vehicle record cannot be deleted until it is externalized, thus ensuring that a complete service history is maintained. Use of this feature can cause a header to be written to each DVD as a part of the externalization process such that if the current DVD is internally labeled #10, it would be expected that nine additional DVDs exist. The use of a WORM device can also prevent modification of the recorded data so that a future purchaser of the vehicle is assured that the compiled service record is accurate and complete.

Video compression techniques, such as encoding in a compressed format, for example, XVID, dropping frames, and keeping the window dimensions within limits, may be used for the sake of reducing storage space. These techniques typically are 'lossy' thus resulting in a diminution of the video quality. Thus, a balance must be made between sufficient quality to be able to view the video and see enough detail, and efficient storage requirements.

When using a wired or wireless network, a specialized program or web service from the vehicle's reviewing system allows the user to navigate through recorded footage index by date, maintenance task, or other metadata data.

In a proprietary interface embodiment, the device that interfaces with the vehicle can provide a method for the user to navigate through the recorded footage indexed by data, maintenance task, or other metadata data.

Tamper Detection/Notification Systems

It is important for vehicle owners to be notified if the visual recording system has been tampered with. Two subsystems may be used to notify the vehicle owner of tampering; a tamper detection system and a tamper notification system enabled in FIG. 2. There are multiple types of possible tampering, such as tampering of the recording notification system, tampering of the visual recording system, and tampering of the storage system.

Tampering with the recording notification system is an attempt to prevent the system from realizing that it should be recording. Tamper prevention/detection requires the use of multiple sensors in conjunction with methods to use those multiple sensors to make tampering difficult. Using multiple sensors and different types of sensors in concert makes it difficult to disable the recording notification system. Some systems, such as close proximity RFID (radio frequency identification) sensors or tags, are more difficult to tamper with than hood latch sensors. Additionally, if using RFID tags, unique numbers can be assigned to each tag to prevent the use of a counterfeit tag near the sensor. A radio frequency tag is associated with a component or location within the vehicle. A receiver, such as a radio frequency reader, is used to capture a signal from said tag. It also may employ circuitry to transmit the captured signal to a remote location, such as the on-board computer module. A converter may be used for converting the signal from the reader into a data stream acceptable to the computer module.

Tampering with the visual recording system requires preventing the visual recording system from capturing video. Several methods could possibly be used to prevent recording. One possibility is to cover one of the visual recording systems with an opaque object or substance. A method to detect this tamper action is to compare the light input from a camera with light sensors in various locations in the vehicle. Additionally, another tampering method would be to place an object far enough away to allow light levels to be consistent with the sensors but still block the field of view. A method to detect this would be to have a detectable reference line located within the field of vision of the camera. If that reference line was not recorded for a long enough period of time, the system has been tampered with. Visual recognition software would be able to detect if the reference line was not in the field of view.

Tampering with the storage system may entail attempting to physically access the storage medium. The storage medium could be installed in an enclosure that when forced opened would notify the tampering system.

User notification of tampering can take several forms. In systems with advanced visual displays, the exact tamper type detected could be displayed with text or a graphical depiction of the vehicle, and where the tampering took place. In a vehicle with a more simple indication system, a standard dashboard "warning" light could be engaged to alert the vehicle's driver. In a vehicle with a car alarm, the car alarm can be engaged.

A vehicle motion detection system detects when the vehicle is in motion and presents that information to the video recording controller system. Detection could be obtained using methods either internal to the system, such as accelerometers, or external to the system, such as accessing the current speed from the speedometer system. Other embodiments might prefer to check motion by integrating with the odometer. In other embodiments, a GPS system can be used to determine if the vehicle has moved over a predetermined threshold.

Service Tracking System

While shown and described herein as a method and system for tracking maintenance services that have been performed on a vehicle, it is understood that the invention further provides various alternative embodiments. For example, in one embodiment, the invention provides a computer-readable/useable medium that includes computer program code to enable a computer infrastructure to manage the various logic steps in the process. To this extent, the computer-readable/useable medium includes program code that implements each of the various process steps.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory and/or the storage system (e.g., a fixed disk, a read-only memory, a random access memory, a cache memory, etc.).

Figure 3:
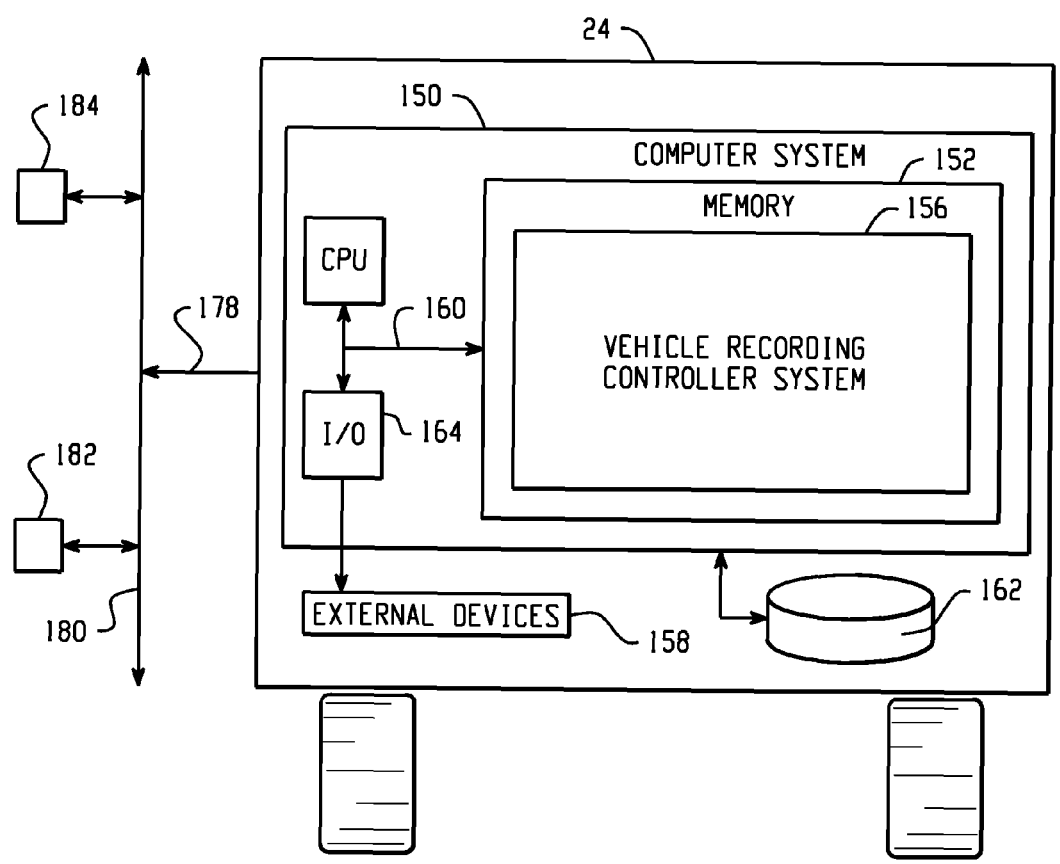
FIG. 3 exemplifies a computer implementation of the system of the present invention.

As shown in FIG. 3, the vehicle 24 includes a computer system 150, such as a vehicle central computer (VCC). The computer system 150 comprises a processing unit, a memory 156, a bus 160, and input/output (I/O) interfaces 164. Further, the computer system 150 is shown in communication with external I/O devices/resources 158 and storage system 162. In general, the processing unit 150 executes computer program code, such as the code to implement the parts detection system, which is stored in the external memory 156 and/or database storage system 162.

While executing computer program code, the processing unit 150 can read and/or write data to/from the memory 156, the storage system 162, and/or the I/O interfaces 164. The bus 160 provides a communication link between each of the components in computer system 150. The external devices 158 can comprise any of the previously mentioned components, such as the RFID tag, the reader, the data steam converter and the user notification module.

Further, I/O interfaces 164 can comprise any system for exchanging information with one or more of the external device 158. Still further, it is understood that one or more additional components (e.g., system software, math co-processing unit, etc.) not shown in FIG. 4 can be included in computer system 150. However, if computer system 150 comprises a handheld device or the like, it is understood that one or more of the external devices 158 (e.g., a display) and/or the storage system 162 could be contained within computer system 150, not externally as shown. The computer system can further include a wired or wireless connection 178 to allow it to communicate outside of the vehicle to, for example, an owner 182 or dealer 184. This capability allows the transfer of updated information for any of the purposes heretofore described.

The storage system 162 can be any type of system (e.g., a database) capable of providing storage for information under the present invention. To this extent, the storage system 162 could include one or more storage devices, such as a magnetic disk drive or an optical disk drive. In another embodiment, the storage system 162 includes data distributed across, for example, a local area network (LAN), wide area network (WAN) or a storage area network (SAN) (not shown). In addition, although not shown, additional components, such as cache memory, communication systems, system software, etc., may be incorporated into computer system 150.

The invention provides a business method that performs the process steps of the invention on a subscription, advertising, and/or fee basis. That is, a service provider could monitor the maintenance and repair for or on behalf of its customer such as the owner of the vehicle, the vehicle seller or the service garage. The monitoring would include reviewing of the recordings showing the repairs of the vehicle including component removal, repair and replacements. In this case, the service provider can create, maintain, support, etc., a computer infrastructure that performs the process steps of the invention for one or more of these customers. In return, the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software, a library of functions, an operating system, a basic I/O system/driver for a particular computing system and/or I/O device, and the like.

The computer infrastructure of FIG. 3 is only illustrative of various types of computer infrastructures for implementing the invention. For example, in one embodiment, computer infrastructure comprises two or more computing devices (e.g., a server cluster) that communicate over a network to perform the various process steps of the invention. Moreover, computer system 50 is only representative of various possible computer systems that can include numerous combinations of hardware.

To this extent, in other embodiments, computer system 50 can comprise any specific purpose for computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 52 may comprise a single processing unit, or be distributed across one or more processing units in one or more locations, e.g., on a client and server. Similarly, the memory 56 and/or the storage system 62 can comprise any combination of various types of data storage and/or transmission media that reside at one or more physical locations.

With an active tag, the RFID tag includes an internal power source, such as a battery, a solar cell, etc. that powers the integrated circuit, which broadcasts the required information for reception by an authorized reader tuned to a broadcast frequency. Alternatively or additionally, the RFID tag may be powered from the battery of the vehicle. The RFID tag may also be semi-passive in that an internal battery or the vehicle's battery may provide power to activate the tag, but the field provided by the reader invokes the broadcast of the required information.

While shown and described herein as a method and system for making video recordings of maintenance, repairs and tampering with a motor vehicle, it is understood that the invention further provides various alternative embodiments. For example, in one embodiment, the invention provides a computer-readable/useable medium that includes computer program code to enable a computer infrastructure to manage the detection, the recording and the logic steps of the process. To this extent, the computer-readable/useable medium includes program code that implements each of the various process steps of the invention.

What is claimed is:

1. A system, comprising:
    sensor means located on a motor positioned to detect and signal both an onset and a completion of an activity performed on a motor vehicle, wherein the activity involves maintenance or repair to the motor vehicle;
    a video camera located on the motor vehicle positioned within a recording range of a vicinity of the activity that captures images of the activity as it is performed in response to the signaled onset of the activity;
    a video recording means located on the vehicle that records the video camera images of the activity from the video camera to a storage system; and
    a controller that automatically:
        activates the video camera in response to the sensor means onset signal;
        deactivates the video camera and determines if a part or fluid of the motor vehicle was replaced in response to the sensor means completion signal;
        if determined that neither the part nor the fluid were replaced, deletes the video camera images of the activity recorded to the storage system since the onset signal; and
        if determined that either the part or the fluid was replaced, concatenates the video camera images of the activity recorded to the storage system since the onset signal with any other recorded images stored on the storage system.

2. The system according to claim 1, further comprising:
    a tamper detection system that determines a tampering in response to detecting at least one of an attempt to prevent the sensor means from signaling the onset of the activity, an attempt to prevent the video camera from capturing the images of the activity as it is performed in response to the record signal, and an attempt to physically access the recording means storage system; and
    a tamper notification system that alerts a user of the tampering determined by the tamper detection system.

3. The system according to claim 1, further comprising:
    a motion detection system located on the motor vehicle that, in response to the sensor means signal of the completion of an activity, detects movement of the motor vehicle and measures an amount of the detected movement of the motor vehicle until the amount of the measured detected movement of the motor vehicle meets a predetermined distance threshold; and
    wherein the controller further determines if the part or fluid of the motor vehicle was replaced in response to a signal from the motion detection system that the amount of the measured detected movement of the motor vehicle meets the predetermined distance threshold.

4. The system according to claim 3, wherein the controller concatenates the video camera images of the activity recorded to the storage system since the onset signal with the any other recorded images stored on the storage system to create one seamless video recording that is indexed with metadata of the activity, the metadata comprising a date and time of the activity, a part or fluid replaced or service performed by the activity, and a location of video footage on the storage device.

5. The system according to claim 4 wherein the sensor means is located within a recording range of the video camera and within a portion of the vehicle where the activity is to occur and includes logic to activate the video recording means when the activity is commenced.

6. The system according to claim 4 wherein the video camera further:
    captures the images of the activity in a high quality video over a wide spectrum of light conditions;
    captures the images of the activity in a digital streaming output that is encoded in a low-loss format;
    is motion activatable; and
    generates a time stamped output.

7. The system according to claim 4 wherein the video recording means further comprises means for storing the created seamless video recording that is indexed with the metadata of the activity on an indexable rapid access, high reliability storage medium, and means for reviewing the recording.

8. The system according to claim 4 wherein the sensor means comprises at least one of a mechanical trigger, a motion detector, a light detector, an infrared detector, a magnetic detector, and an RFID sensor.

9. The system according to claim 8 wherein the sensor means comprises the RFID sensor, and an RFID tag that is associated with a component of the motor vehicle upon which a maintenance or a repair activity is to be performed.

10. A method for recording maintenance and repair activity performed on a motor vehicle, comprising:
   detecting and signaling via a sensor means that is positioned on or within a motor vehicle both an onset and a completion of a maintenance or repair activity performed on the motor vehicle;
   in response to the signaled onset of the activity, capturing images of the activity as it is performed via a video camera located on the motor vehicle that is positioned within a recording range of a vicinity of the activity;
   recording the video camera images of the activity from the video camera to a storage system located on the vehicle;
   deactivating via a controller the video camera in response to the sensor means completion signal;
   determining via the controller automatically if a part or fluid of the motor vehicle was replaced in response to the signaled completion of the activity, and:
      if determined that neither the part nor the fluid were replaced, automatically deleting the video camera images of the activity recorded to the storage system since the onset signal; and
      if determined that either the part or the fluid was replaced, automatically concatenating the video camera images of the activity recorded to the storage system since the onset signal with any other recorded images stored on the storage system.

11. The method of claim 10, further comprising, in response to the sensor means signal of the completion of an activity:
   detecting movement of the motor vehicle via a motion detection system located on the vehicle; and
   measuring an amount of the detected movement of the motor vehicle via the motion detection system until the amount of the measured detected movement of the motor vehicle meets a predetermined distance threshold; and
   wherein the step of determining via the controller if the part or fluid of the motor vehicle was replaced in response to the signaled completion of the activity is further in response to a signal from the motion detection system that the amount of the measured detected movement of the motor vehicle meets the predetermined distance threshold.

12. The method of claim 11, wherein the step of the controller concatenating the video camera images of the activity recorded to the storage system since the onset signal with the any other recorded images stored on the storage system further comprises:
   creating one seamless video recording that is indexed with metadata of the activity, wherein the metadata comprises a date and time of the activity, a part or fluid replaced or service performed by the activity, and a location of video footage on the storage device.

13. The method of claim 12, further comprising:
   determining a tampering via a tamper detection system on the vehicle in response to detecting at least one of an attempt to prevent the sensor means from signaling the onset of the activity, an attempt to prevent the video camera from capturing the images of the activity as it is performed in response to the record signal, and an attempt to physically access the recording means storage system; and
   alerting a user of the tampering determined by the tamper detection system.

14. An article of manufacture, comprising:
   a computer readable storage medium having computer readable program code embodied therewith, the computer readable program code comprising instructions that, when executed by a computer processor, cause the computer processor to:
   in response to a signaled onset of a maintenance or repair activity performed on a motor vehicle that is detected by a sensor means that is positioned on or within the motor vehicle, signal a video camera located on the motor vehicle and positioned within a recording range of a vicinity of the activity to capture images of the activity as it is performed, wherein images of the activity from the video camera are recorded to a storage system located on the vehicle;
   deactivate the video camera in response to a signaled completion of the activity by the sensor means;
   automatically determine if a part or fluid of the motor vehicle was replaced in response to the signaled completion of the activity;
   if determined that neither the part nor the fluid were replaced, automatically delete the video camera images of the activity recorded to the storage system since the onset signal; and
   if determined that either the part or the fluid was replaced, automatically concatenate the video camera images of the activity recorded to the storage system since the onset signal with any other recorded images stored on the storage system located on the vehicle.

15. The article of manufacture of claim 14, wherein the computer readable program code instructions, when executed by the computer processor, further cause the computer processor to, in response to the sensor means signal of the completion of an activity:
   detect movement of the motor vehicle via a motion detection system located on the vehicle;
   measure an amount of the detected movement of the motor vehicle until the amount of the measured detected movement of the motor vehicle meets a predetermined distance threshold; and
   determine if the part or fluid of the motor vehicle was replaced in response to the signaled completion of the activity in response to a determination that the amount of the measured detected movement of the motor vehicle meets the predetermined distance threshold.

16. The article of manufacture of claim 14, wherein the computer readable program code instructions, when executed by the computer processor, further cause the computer processor to concatenate the video camera images of the activity recorded to the storage system since the onset signal with the any other recorded images stored on the storage system by creating one seamless video recording that is indexed with metadata of the activity, wherein the metadata comprises a date and time of the activity, a part or fluid replaced or service performed by the activity, and a location of video footage on the storage device.

17. A method of providing a service for recording maintenance and repair activity performed on a motor vehicle, the method comprising:

providing a sensor means located on a motor vehicle positioned to detect and signal both an onset and a completion of an activity performed on a motor vehicle to a controller located on the motor vehicle, wherein the activity involves maintenance or repair to the motor vehicle; and wherein the provided controller:

in response to a signaled onset of the activity detected by the sensor means, signals a video camera located on the motor vehicle and positioned within a recording range of a vicinity of the activity to capture images of the activity as it is performed, wherein images of the activity from the video camera are recorded to a storage system located on the vehicle;

deactivates the video camera in response to the signaled completion of the activity detected by the sensor means;

determines if a part or fluid of the motor vehicle was replaced in response to the signaled completion of the activity;

if determined that neither the part nor the fluid were replaced, deletes the video camera images of the activity recorded to the storage system since the onset signal; and if determined that either the part or the fluid was replaced, concatenates the video camera images of the activity recorded to the storage system since the onset signal with any other recorded images stored on the storage system located on the vehicle.

18. The method of claim 17, wherein the provided controller, in response to the sensor means signal of the detected completion of the activity:

detects movement of the motor vehicle via a motion detection system located on the vehicle;

measures an amount of the detected movement of the motor vehicle until the amount of the measured detected movement of the motor vehicle meets a predetermined distance threshold; and determines if the part or fluid of the motor vehicle was replaced in response to the signaled completion of the activity in response to a determination that the amount of the measured detected movement of the motor vehicle meets the predetermined distance threshold.

19. The method of claim 18, wherein the provided controller concatenates the video camera images of the activity recorded to the storage system since the onset signal with the any other recorded images stored on the storage system by creating one seamless video recording that is indexed with metadata of the activity, wherein the metadata comprises a date and time of the activity, a part or fluid replaced or service performed by the activity, and a location of video footage on the storage device.

20. The method of claim 18, wherein the provided controller further:

determines a tampering via a tamper detection system on the vehicle in response to detecting at least one of an attempt to prevent the sensor means from signaling the onset of the activity, an attempt to prevent the video camera from capturing the images of the activity as it is performed in response to the record signal, and an attempt to physically access the recording means storage system; and alerts a user of the tampering determined by the tamper detection system.

* * * * *